United States Patent

[11] 3,597,035

| [72] | Inventors | George W. Church, Jr.;<br>Ronald A. Miller, both of San Antonio, Tex. |
|---|---|---|
| [21] | Appl. No. | 801,604 |
| [22] | Filed | Feb. 24, 1969 |
| [45] | Patented | Aug. 3, 1971 |
| [73] | Assignee | Church's Fried Chicken, Inc.<br>San Antonio, Tex. |

[54] FLOUR AND BATTER TABLE
8 Claims, 5 Drawing Figs.

[52] U.S. Cl.................................................... 312/210.5
[51] Int. Cl................................................... A97b 00/00,
                                                         A41j 43/22
[50] Field of Search....................................... 312/210.5;
                                                         209/374

[56] References Cited
UNITED STATES PATENTS

| 757,400 | 4/1904 | Guelff | 312/210.5 |
| 1,000,142 | 8/1911 | Becker | 312/210.5 |
| 1,066,006 | 7/1913 | Forgy | 312/210.5 |

*Primary Examiner*—Patrick D. Lawson
*Attorney*—James A. Bargfrede

ABSTRACT: Apparatus for economically and efficiently preparing fried food such as fast service fried chicken. The apparatus is characterized by a unitary construction in which flour and batter may be added to the food to be fried so that a substantially continuous cooking operation occurs.

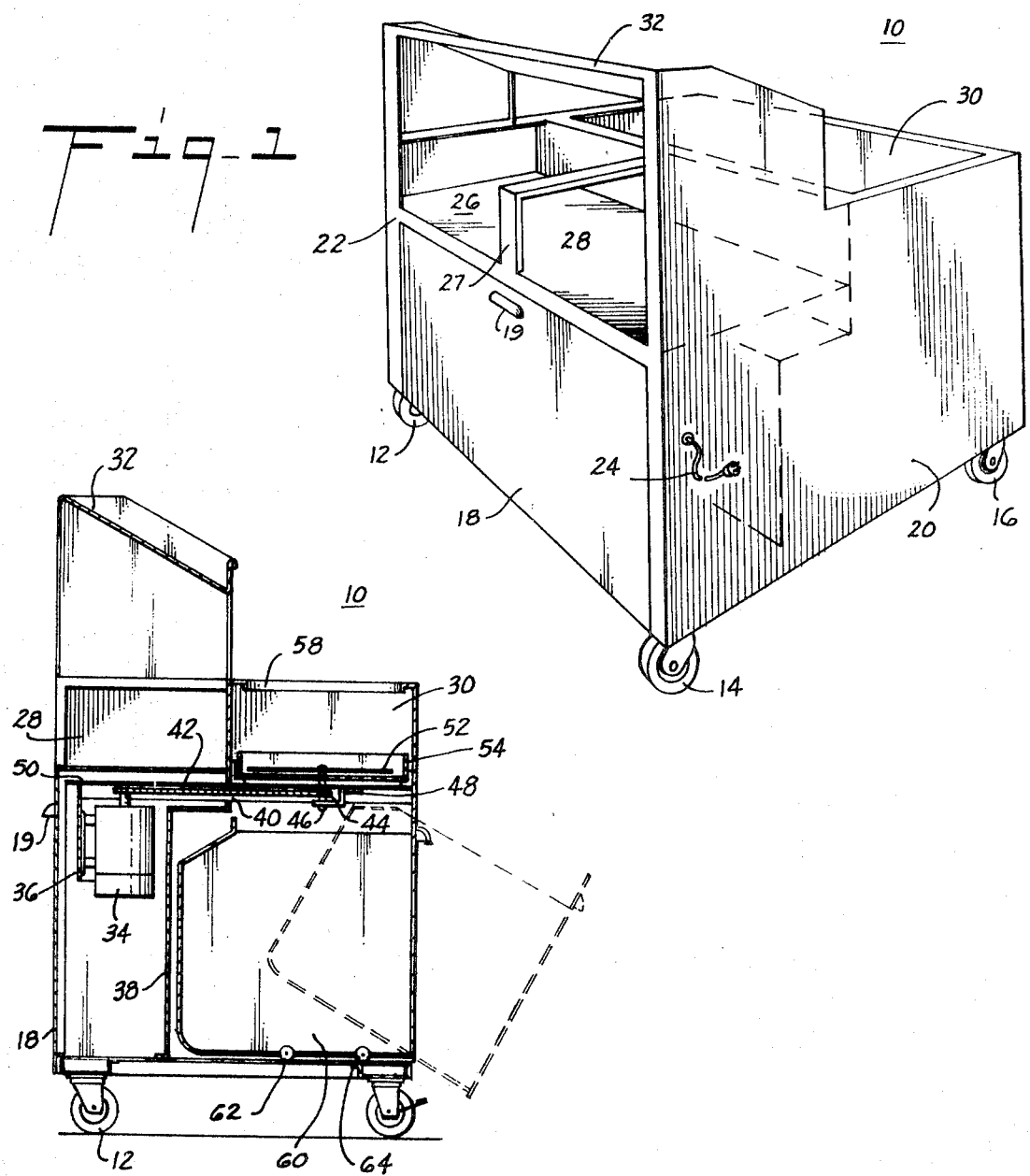

PATENTED AUG 3 1971

GEORGE W. CHURCH, JR.
RONALD A. MILLER
INVENTORS.

BY James A. Bargfrede

ATTORNEY

FLOUR AND BATTER TABLE

BACKGROUND OF THE INVENTION

1. Field of the Invention

The present invention relates to apparatus used in the fast service fried chicken business where quality of product, speed of operation, and cleanliness are of paramount importance.

2. Description of the Prior Art

Prior art devices are cumbersome and do not provide easy cleaning and continual operation as does the present invention. Such prior art devices do not provide continual sifting of flour to provide clean flour of uniform texture as does the present invention. The batter and flour receptacle are located for maximum efficiency and ease of operation. Also a convenient storage shelf is provided so that an operator makes a minimum number of hand movements in preparing fried chicken.

SUMMARY OF THE INVENTION

A flour and batter table having unitary construction is mounted on a plurality of casters and contains a continuous flour-sifting system wherein a slideable bin is positioned below a flour pan and a flour sifter, a waste receptacle and a batter receptacle are positioned rearwardly of the flour sifter. An upper storage shelf area is provided above the waste receptacle and the batter receptacle for storage of the food such as chicken to be fried. The continuous flour sifter has a blade assembly which may be uncoupled without the use of any tools and the entire flour storage and sifter system may be disassembled easily for cleaning and for repair.

BRIEF DESCRIPTION OF THE DRAWINGS

FIG. 1 is a rear perspective view of the flour and batter table of the present invention;

FIG. 2 is a sectional side elevational view of the flour and batter table of the present invention;

DETAILED DESCRIPTION

Figure 3:
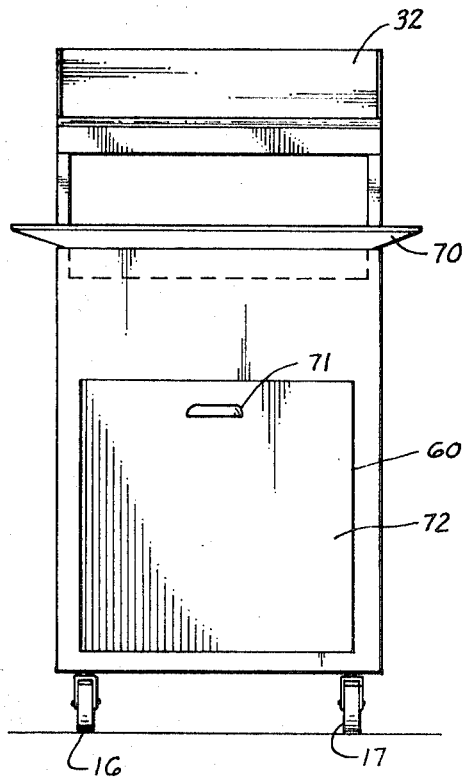
FIG. 3 is a front elevational view of the flour and batter table of the present invention.

FIG. 1 is a rear perspective view of the flour and batter table of the present invention. The entire unitary assembly 10 preferably is mounted on four casters, three of which are shown and designated 12, 14 and 16. A rear access panel 18 having a handle 19 is positioned between end members 20 and 22 to allow easy access to the interior of the flour and batter table 10. An electric cord 24 which may be on a windup reel is shown protruding from end member 20. The electric cord 24 is used to provide electric power to an electric motor housed within the flour and batter table as will be explained in detail subsequently. Openings 26 and 28 on each side of member 27 allow a batter pan and a waste pan to be positioned in the rear portion of the flour and batter table 10.

Forward opening 30 allows the flour pan to be positioned in opening 30 with a sifter assembly positioned below opening 30 and below the flour pan.

A storage shelf 32 is positioned on the upper portion of the unitary flour and batter table assembly to store food prior to frying such food.

The flour and batter table of the present invention may be constructed of suitable sheet metal such as 16-gauge or 18-gauge stainless steel to allow easy cleaning of the entire flour and batter table assembly and also to prevent contamination of the food which is used with the flour and batter table. It will be appreciated that noncorrosive material must be utilized since food for human consumption is contemplated to be prepared on the flour and batter table of the present invention.

FIG. 2 is a sectional side elevational view of the flour and batter table of the present invention. Rear panel 18 allows access to motor 34 which is mounted on a channel frame assembly 36. Motor 34 may be a 1/20 horsepower shaded pole 12 r.p.m. gear-head motor totally enclosed and fan cooled. A dust guard panel 38 has an opening 40 which allows a drive chain 42 from motor 34 to be coupled to sprocket 44 which is coupled to shaft 46. Shaft 46 is positioned on bracket 48. Bracket 48 may be coupled to horizontal member 50 to provide support for shaft 46 which has coupled thereto sprocket 44 driven by drive chain 42 which in turn is driven by electric motor 34. Sifter arm 52 is coupled to shaft 46 and is driven to provide rotational movement within pan 54. The sifter arm 52 is removable from shaft 46 without the need for any tools thereby providing easy cleaning of the sifter pan 54.

Opening 58 allows a flour pan 70 to be positioned in the unitary structure so that as flour is passed through the flour pan 70 to the sifter pan 54, the sifter arm 52 rotates to allow flour to pass through the lower portion of sifter pan 54 into the bin 60 in the lower portion of the flour and batter table. The bin 60 has a plurality of ball bearing rollers 62 and 64 which allow the bin to be slideably moved and tilted as shown in the broken line view so that the flour which accumulates in bin 60 may be removed and again utilized by placing in the flour pan 70 which is positioned in opening 58. A flour pan hole cover may be used as a scoop to remove flour from the bin 60 and placed in the flour pan. Thus there is a substantially continuous sifting of the flour utilized in the preparation of food prepared with the flour and batter table of the present invention.

Thus in utilization of the flour and batter table of the present invention in preparing fried chicken for example, the cut up pieces of chicken may be stored on shelf 32 and such pieces may be dipped in flour in the flour pan in opening 58, then such pieces are dipped in batter which may be in a pan positioned in opening 26 or opening 28. The pieces of chicken then are again dipped in flour in the flour pan opening 58. As mentioned previously a waste pan in may be positioned in either opening 26 or opening 28 to allow flour balls and other foreign material to be removed and stored in such waste pan.

In viewing FIG. 2 it will be appreciated that the construction of the flour and batter table of the present invention allows maximum utilization of space while at the same time providing substantially continual cleanliness of the equipment without the necessity of shutting down the overall food frying operation.

FIG. 3 is a front elevational view of the flour and batter table of the present invention showing shelf 32 at the uppermost portion of the flour and batter table. Four pan 70 is shown in position in FIG. 3 above bin 60 said bin having a door 72 with a handle 71. Front casters 16 and 17 also are shown in FIG. 3. Casters 16 and 17 may be of the Neoprene-tired type having a brake for fixedly positioning the flour and batter table.

Figure 4:
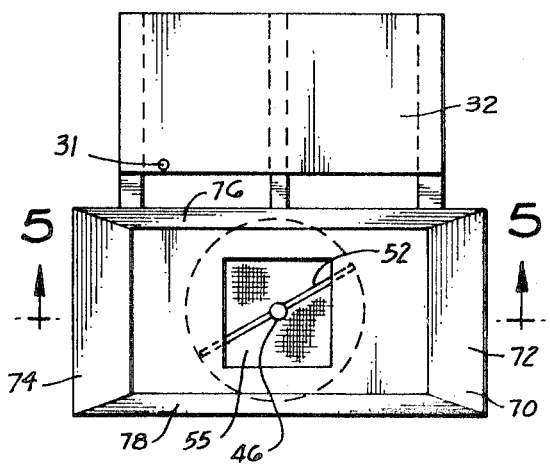
FIG. 4 is a top plan view of the flour pan and sifter assembly of the present invention.

FIG. 4 is a top plan view of the table showing shelf 32 and flour pan 70. A weep hole 31 allows drainage of the liquid from shelf 32. Pan 70 includes end members 72 and 74 and side members 76 and 78. Sifter arm 52 is partially shown coupled to shaft 46 so that as sifter arm 52 rotates, a circle is described as shown by the broken line. An opening 55 in flour pan 70 allows flour in pan to be fed by gravity to the sifter assembly. A cover for opening 55 may be inserted to close the opening 55 and the cover may also be used to carry flour from the bin 60 to flour pan 70. Thus as flour is stored in the flour bin 70 the flour is sifted through sifter 54 as sifter arm 52 rotates about shaft 46.

Figure 5:
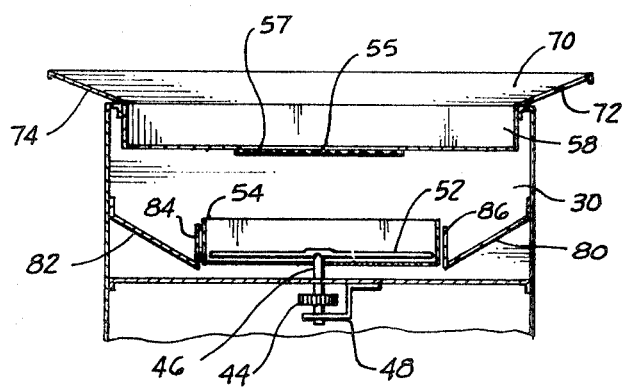
FIG. 5 is a sectional front elevational view of the flour pan and sifter portion of the flour and batter table of the present invention taken along line 5–5 of FIG. 4.

FIG. 5 is a sectional elevational view of the flour and sifter mechanism taken along line 5–5 of FIG. 4. Flour pan 70 having end members 72 and 74 is positioned in opening 58 in the upper portion of forward opening 30. Opening 55 is positioned substantially in the center of the flour pan 70 over sifter arm 52 mounted on shaft 46. Hole cover 47 may be used to control the size of opening 55. It will be recalled that shaft 46 is mounted on bracket assembly 48 and sprocket 44 is positioned on shaft 46. Sifter pan 54 is positioned on the sides and below the sifter arm 52 so that as flour passes through opening 55 into the sifter pan 54, the flour then passes into storage bin 60 in the lower compartment of the flour and batter table.

Splash panels 80 and 82 provide positioning to the sifter pan 54 so that the flour will go into bin 60. Members 84 and 86 are positioned vertically on the ends of members 80 and 82 to allow fixed positioning to be given to the sifter pan 54. It will be apparent from FIG. 5 that the flour pan 70 may be removed periodically to allow access to be made to the sifter arm 52 and the sifter pan 54 for cleaning. Also removal of the sifter arm 52 may be accomplished so that sifter pan 54 may be removed and the foreign particles and flour balls which may have accumulated may be conveniently disposed of and stored in the waste receptacle in the rear portion of the flour and batter table. The construction and arrangement of the flour pan and sifter pan is important and provides a substantial improvement over known prior art apparatus because of the elimination of "down time" normally required in preparing fried food. In positioning the present invention, there is a substantially continuous sifting of the flour utilized in the food frying operation so that the flour is of uniform quality and texture.

Thus the present invention provides apparatus for use in the continuous preparation of fried foods. Such apparatus is characterized by its compactness, efficiency, and adaptability for cleaning. The quality of the food prepared through utilization of the apparatus of the present invention is maintained uniformly thereby providing a substantially constant quality fried food product.

It will be appreciated that many modifications may be made to the apparatus shown and described without departing from the spirit of the invention defined by the following claims.

I claim

1. Apparatus adapted for use in preparing fried food, said apparatus including in combination
   a housing having a front, a rear, a top, and a bottom,
   a shelf positioned on said top of said housing,
   first and second storage chambers below said shelf in said rear of said housing,
   an opening below said shelf in said front of said housing,
   flour-sifting means below said opening, and
   a slidable, tiltable storage bin positioned below said flour sifting means.

2. Apparatus defined by claim 1 wherein said flour-sifting means includes a sifter pan, a shaft positioned in said pan, a sifter arm coupled to said shaft, and drive means coupled to said shaft for providing rotation to said shaft and to said sifter arm.

3. Apparatus defined by claim 1 and further including a flour pan having a central hole and positioned in said opening below said shelf.

4. Apparatus defined by claim 3 wherein said flour pan comprises
   a rectangular box having a substantially square hole, in the central portion thereof,
   first and second end members coupled to said box at a slight angle along a horizontal plane which is parallel to said square hole, and
   first and second side members also coupled to said box at a slight angle with respect to said horizontal plane.

5. Apparatus for providing flour of a uniform quality, said apparatus including in combination
   a flour pan having a central hole,
   sifting means positioned below said flour pan, said sifting means including a sifting pan having a meshed bottom, a rotatable shaft extending through said bottom, a sifter arm coupled to one end of said rotatable shaft, a sprocket coupled to the other end of said rotatable shaft, a chain coupled to said sprocket, and a motor having a gear head coupled to said chain for providing rotation to said rotatable shaft whereby flour is agitated and passed through said meshed bottom of said sifting pan, and
   a storage bin movable positioned below said sifting means.

6. An article of manufacture including in combination
   a housing including first and second end members, a shelf coupled to said end members, first and second rear openings below said shelf and adapted for receiving first and second containers, a front opening between said first and second end members and near first and second rear openings, a front compartment below said front opening and a rear compartment below said first and second rear openings, a door pivotally coupled between said first and second end members to allow access to said rear compartment,
   a storage bin including a back and a bottom positioned in said front compartment, said storage bin including a plurality of ball bearing rollers mounted on said bottom with said back having a lip edge to allow forward tilting of said storage bin after said storage bin is partially removed from said front compartment, and
   sifter means positioned in said housing.

7. An article of manufacture including in combination
   a housing including first and second end members, a shelf coupled to said end members, first and second rear openings below said shelf and adapted for receiving first and second containers, a front opening between said first and second end members and near said first and second rear openings, a front compartment below said first and second rear openings, a door pivotally coupled between said first and second end members to allow access to said rear compartment,
   a storage bin including a back and a bottom positioned in said front compartment, said storage bin including a plurality of ball bearing rollers mounted on said bottom with said back having a lip edge to allow forward tilting of said storage bin after said storage bin is partially removed from said front compartment, and
   sifter means positioned in said housing, said sifter means including a sifter pan, a shaft extending into said sifter pan, a sifter arm snap-coupled to one end of said shaft, and drive means coupled to the other end of said shaft to cause rotation of said shaft and movement of said sifter arm.

8. Apparatus defined by claim 1 wherein a plurality of casters are coupled to the bottom of said housing.